(12) United States Patent
Wen

(10) Patent No.: US 10,710,020 B2
(45) Date of Patent: Jul. 14, 2020

(54) PROCESSES FOR GAS SEPARATION BY SOLVENT OR ABSORBENT

(71) Applicant: UOP LLC, Des Plaines, IL (US)

(72) Inventor: Xiaoming Wen, Palatine, IL (US)

(*) Notice: Subject to any disclaimer, the term of this patent is extended or adjusted under 35 U.S.C. 154(b) by 238 days.

(21) Appl. No.: 16/007,437

(22) Filed: Jun. 13, 2018

(65) Prior Publication Data

US 2019/0001256 A1  Jan. 3, 2019

Related U.S. Application Data

(60) Provisional application No. 62/527,807, filed on Jun. 30, 2017.

(51) Int. Cl.
| | | |
|---|---|---|
| *B01D 53/14* | (2006.01) | |
| *B01D 53/62* | (2006.01) | |
| *B01D 53/48* | (2006.01) | |
| *B01D 53/52* | (2006.01) | |

(52) U.S. Cl.
CPC ..... *B01D 53/1406* (2013.01); *B01D 53/1425* (2013.01); *B01D 53/1462* (2013.01); *B01D 53/1493* (2013.01); *B01D 2252/2025* (2013.01); *B01D 2252/2026* (2013.01); *B01D 2252/2053* (2013.01); *B01D 2252/2056* (2013.01); *B01D 2252/20442* (2013.01); *B01D 2252/20452* (2013.01); *B01D 2252/20457* (2013.01); *B01D 2252/20468* (2013.01); *B01D 2256/16* (2013.01); *B01D 2256/20* (2013.01); *B01D 2256/24* (2013.01); *B01D 2256/245* (2013.01); *B01D 2258/0283* (2013.01)

(58) Field of Classification Search
CPC ............ B01D 53/1406; B01D 53/1462; B01D 53/1425; B01D 53/1493
USPC ......... 95/159, 163, 172, 174, 177, 186, 204, 95/223, 235, 236
See application file for complete search history.

(56) References Cited

U.S. PATENT DOCUMENTS

| | | | | |
|---|---|---|---|---|
| 2,826,266 A | * | 3/1958 | Hachmuth | ............. F25J 3/0209 |
| | | | | 95/203 |
| 3,383,838 A | * | 5/1968 | Carson | ..................... C10K 1/18 |
| | | | | 95/174 |
| 4,498,911 A | | 2/1985 | Deal et al. | |
| 7,377,967 B2 | | 5/2008 | Reddy et al. | |
| 8,795,415 B2 | * | 8/2014 | Katz | ........................ C10K 1/08 |
| | | | | 95/173 |
| 9,334,455 B2 | | 5/2016 | Tanna | |

(Continued)

FOREIGN PATENT DOCUMENTS

| | | |
|---|---|---|
| EP | 2435540 A1 | 5/2016 |
| WO | 2010052643 A1 | 5/2010 |

OTHER PUBLICATIONS

International Search Report and Written Opinion for corresponding application PCT/US 2018/2018/039383,, dated Oct. 25, 2018.

*Primary Examiner* — Thomas M Lithgow

(57) ABSTRACT

Solvent absorption processes for separating components of an impure feed gas are disclosed. The processes involve two stages of gas purification. The acid gases including hydrogen sulfide, carbon dioxide and other sulfur compounds are simultaneously removed from the feed gas by contact with a physical solvent in two stages. The subject matter disclosed provides improved processes to reduce the operating costs of the system.

13 Claims, 1 Drawing Sheet

(56) References Cited

U.S. PATENT DOCUMENTS

2008/0210092 A1    9/2008   Buckles et al.
2015/0375163 A1   12/2015   Wen et al.

* cited by examiner

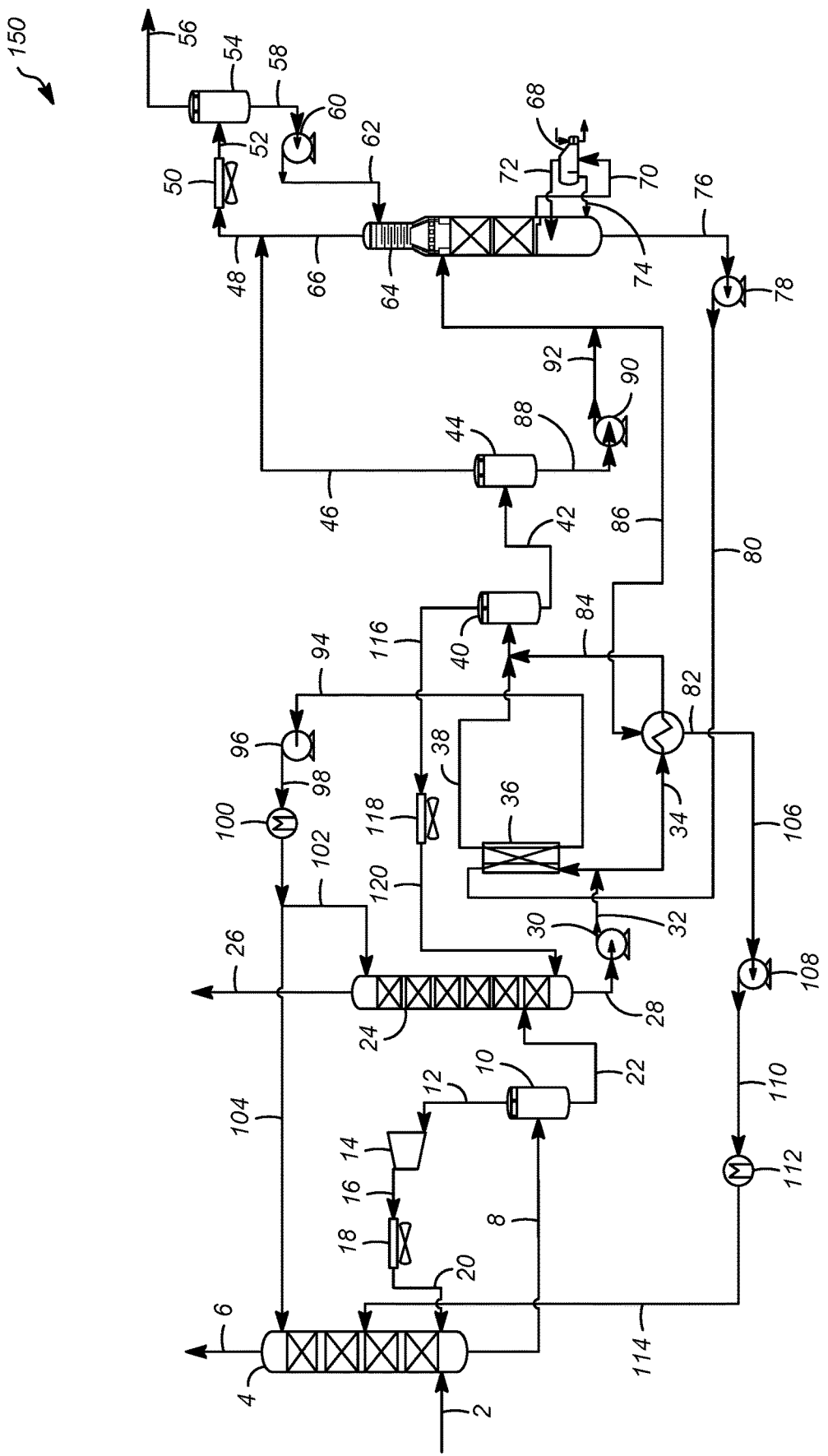

PROCESSES FOR GAS SEPARATION BY SOLVENT OR ABSORBENT

CROSS-REFERENCE TO RELATED APPLICATION

This application claims priority from Provisional Application No. 62/527,807 filed Jun. 30, 2017, the contents of which cited application are hereby incorporated by reference in its entirety.

FIELD

The present invention relates to gas separation processes, for example the separation of contaminants such as carbon dioxide ($CO_2$), hydrogen sulfide ($H_2S$) and other sulfur compounds from gas streams containing such contaminants using a solvent absorption process. The present invention specifically relates to a two-stage absorption operation of the solvent absorption process with reduced operating expenses and utility consumption.

BACKGROUND

The removal of carbon dioxide, hydrogen sulfide and other sulfur compounds from impure gas streams such as natural gas or synthesis gas is desirable, for among other reasons, to prevent damage to equipment, to improve the heating value of the purified gas product and to make the gas product to be suitable as feedstock for downstream processes. Differences in a number of properties between the impurities like hydrogen sulfide, carbon dioxide and the desired gas product can serve as potential bases for gas separations. These differences include solubility, acidity in aqueous solution, and molecular size and structure. Possible separations can therefore rely on physical or chemical absorption into liquid solvents, pressure swing or temperature swing adsorption with solid adsorbents, and membrane systems.

Liquid solvent based absorption (i.e., "wet") systems, for example, are commonly used for natural gas and synthesis gas purification to remove hydrogen sulfide, carbon dioxide and other impurities. These contaminants can be preferentially absorbed in physical solvents such as dimethylethers of polyethylene glycol or chemical solvents such as alkanolamines or alkali metal salts. The resulting hydrogen sulfide and $CO_2$-rich (i.e., "loaded") solvent is subsequently regenerated by heating to recover the contaminants such as hydrogen sulfide, carbon dioxide and produce a regenerated solvent that can be recycled for further re-use in the absorption process. Solvent regeneration is also normally conducted at a reduced pressure relative to the upstream absorption pressure to promote vaporization of absorbed carbon dioxide from the solvent. The carbon dioxide and hydrogen sulfide may be recovered in more than one stream, including vapor fractions of flash separators and regenerator column vapor effluents.

Chemical solvents, and particularly amines and other basic compounds, react with acidic contaminants such as hydrogen sulfide and carbon dioxide, to form a contaminant-solvent chemical bond. Considerable energy release is associated with this bond formation during the thermodynamically-favored acid-base reaction. Consequently, substantial heat input is required to break the bonds of the chemical reaction products and therefore to regenerate chemical solvents. Physical solvents, on the other hand, do not react chemically with gas contaminants, but instead promote physical absorption based on a higher contaminant equilibrium solubility at its partial pressure in the impure gas (i.e., a higher Henry's law constant).

Physical solvents that remain chemically non-reactive with the contaminant components find wide applications in absorption systems for gas separation. The Selexol process, which is licensed by Honeywell UOP, Des Plaines, Ill., is a process known for removal of carbon dioxide, hydrogen sulfide and other sulfur compounds such as carbonyl sulfide (COS) and mercaptans from feed streams such as syngas produced by gasification of coal, coke or heavy hydrocarbon oils by using a particular physical solvent. Such processes can also be used for removal of ammonia, hydrogen cyanide, and metal carbonyls. The solvent circulation in a Selexol process is usually high compared to a chemical solvent such as an amine. The high solvent circulation could require high regeneration heat input in such cases and may lead to increases in operating cost.

There is a need for an improved process for the removal of acid gases from feed streams using a solvent. Further, to address the problems of high utility consumption and increased operating costs, there is a need for a new process to efficiently operate the processing unit with reduced solvent circulation rates and reduced utility consumption.

SUMMARY

An embodiment of the subject matter is a process for a two-stage gas purification contacting an impure feed gas stream comprising hydrogen sulfide, carbon dioxide and sulfur compounds and a solvent stream in a counter-current absorber to provide a first overhead gas stream and a first solvent effluent bottoms stream comprising absorbed hydrogen sulfide, absorbed carbon dioxide and absorbed other sulfur compounds; passing the first solvent effluent bottoms stream to a concentrator/reabsorber and contacting the stream with a gas stream from a first downstream rich solvent flash drum or an inert gas stream in the concentrator/reabsorber to provide a second overhead gas stream and a second solvent effluent bottoms stream; splitting the second solvent effluent bottoms stream into a first stream and a second stream, heat-exchanging the first stream with a solvent stream from a downstream regenerator, heat-exchanging the second stream with a portion of a solvent stream from a second downstream rich solvent flash drum; after the heat-exchanges, combining said first stream and said second stream to produce a combined stream and passing the combined stream to the first downstream rich solvent flash drum, passing the solvent stream from the first downstream rich solvent flash drum to the second downstream rich solvent flash drum; passing partial of the solvent stream from the second rich solvent flash drum back to the counter-current absorber, passing a remaining portion of the solvent stream from the second downstream rich solvent flash drum to the downstream regenerator to provide an overhead gas stream and a bottom solvent effluent stream, and passing the bottom solvent effluent stream from the downstream regenerator back to a top of the counter-current absorber. Another embodiment of the subject matter is a process for a two-stage gas purification process comprising contacting an impure feed gas stream comprising hydrogen sulfide, carbon dioxide and other sulfur compounds and a solvent stream in a counter-current absorber to provide a first overhead gas stream and a first solvent effluent bottom stream comprising absorbed hydrogen sulfide and absorbed carbon dioxide. The first solvent effluent bottom stream is passed to a low pressure flash drum to provide a second overhead gas stream and a second solvent effluent bottom stream. A first portion of the second solvent effluent stream is recycled to a top of a first stage of the counter-current absorber. A second portion of the second solvent effluent bottom stream is passed to a regenerator to provide a third overhead gas stream and a third solvent effluent bottom stream. The third solvent effluent bottom stream is recycled to a top of a second stage of the counter-current absorber. A purified product gas stream is recovered at an overhead of the counter-current absorber.

It is an advantage of the subject matter to provide a novel process to remove the acid gases from hydrocarbons with reduced amount of solvent. The present subject matter seeks to provide improved processes to address the problems of high utility consumption and increased operating costs.

Additional objects, advantages and novel features of the examples will be set forth in part in the description which follows, and in part will become apparent to those skilled in the art upon examination of the following description or may be learned by production or operation of the examples. The objects and advantages of the concepts may be realized and attained by means of the methodologies, instrumentalities and combinations particularly pointed out in the appended claims.

BRIEF DESCRIPTION OF THE DRAWING

The FIGURE is a flow scheme for a process to treat a gas stream.

DETAILED DESCRIPTION

The following description is not to be taken in a limiting sense, but is made merely for the purpose of describing the general principles of exemplary aspects. The scope of the present disclosure should be determined with reference to the claims.

A general understanding of the process for a two-stage gas purification in which a contaminant, present as a component of an impure feed gas, is selectively absorbed into a solvent can be obtained by reference to the FIGURE. The process advantageously recovers significant portions of the desired components in the impure feed gas components, as a purified product gas stream. The FIGURE has been simplified by the deletion of a large number of apparatuses customarily employed in a process of this nature, such as vessel internals, feed gas knockout drum, product gas wash and knockout drum, solvent filtration system, temperature and pressure controls systems, flow control valves, recycle pumps, etc. which are not specifically required to illustrate the performance of the subject matter. Furthermore, the illustration of the process of this subject matter in the embodiment of a specific drawing is not intended to limit the subject matter to specific embodiments set out herein.

The present subject matter, as shown in the FIGURE, includes an absorption system 150 for a process of a two-stage gas purification involving selective absorption of the contaminants to a solvent. Many configurations of the present invention are possible, but specific embodiments are presented herein by way of example. A feed in line 2 is passed to absorber vessel 4. Representative impure gas streams include those comprising light hydrocarbons (e.g., $C_1$-$C_3$ hydrocarbons) or hydrogen, or hydrogen and carbon monoxide (CO), with acid gas contaminants such as carbon dioxide ($CO_2$) and hydrogen sulfide ($H_2S$). Examples of such gas streams containing acid gas contaminants include natural gas, synthesis gas, refinery flue gas and biogas. The acid gas concentration of the feed stream may be as high as 70%. The process is directed to purification of impure gas feed stream in which contaminants are preferentially absorbed into a liquid solvent, and particularly a physical solvent.

The principal components of absorption system 150 comprise an absorber 4, a high pressure rich solvent flash drum 10, a medium pressure rich solvent flash drum 40, a low pressure rich solvent flash drum 44, a concentrator/re-absorber 24 and a regenerator 64. The feed stream comprising acid gases in line 2 is passed to the absorber 4 of the absorption system. A gas purification process according to an exemplary embodiment therefore comprises contacting the impure feed gas comprising hydrogen sulfide, carbon dioxide and other sulfur compounds with a solvent, and particularly a physical solvent that selectively (or preferentially) absorbs the acid gases. The impure feed gas stream in line 2 is subjected to contact with a solvent stream in the absorber 4 to provide a treated gas stream 6 and a solvent effluent bottom stream comprising absorbed hydrogen sulfide, absorbed carbon dioxide and absorbed other sulfur compounds in line 8. The operating conditions for the absorber will include an operating temperature as low as 4° C. and a pressure in the range of about 2700 kPa to about 10000 kPa. Representative physical solvents include alcohols, glycol ethers, lactams, sulfolane, N-alkylated pyrrolidones, N-alkylated piperidines, cyclotetramethylenesulfone, N-alkyformamides, N-alkylacetamides, ether-ketones, propylene carbonate, N-methyl-2-pyrrolidone, N-formyl morpholine, and alkyl phosphates. Others include alkyl- and alkanol-substituted heterocyclic hydrocarbons such as alkanolpyridines (e.g., 3-(pyridin-4-yl)-propan-1-ol) and alkylpyrrolidones (e.g., n-methyl pyrrolidone), as well as dialkylethers of polyethylene glycol, with dimethyl ethers of polyethylene glycol being a preferred physical solvent.

The solvent effluent bottoms stream in line 8 may be passed to first rich flash drum 10. The gas taken at the overhead of the rich flash drum in line 12 may be compressed in compressor 14, pass in line 16 to reflux condenser 18, through line 20 to be recycled to a bottom portion of absorber 4 to improve the recovery of the desired components contained in the feed gas stream and the purity of the acid gas to eventually leave the system in line 56. The effluent bottom stream in line 22 from first rich flash drum 10 is passed to concentrator-re-absorber 24. The concentrator-re-absorber 24 is in downstream communication with the absorber 4 and first rich flash drum 10. The effluent bottom stream in line 22 from the rich flash drum goes to concentrator/re-absorber 24 and carbon dioxide stream 26 is vented or sent to an oxidizer (not shown). A bottoms stream 23 exits concentrator/re-absorber 24 to pump 30 to stream 32 and then stream 34 which goes through semi-lean-rich heat exchanger 82 and then as heated stream 84 it is combined with a stream 38 to a second rich solvent flash drum 40. This flash drum is at a medium pressure. A bottoms stream 42 exits flash drum 40 and is sent to a third flash drum 44. A bottoms stream 88 is pumped at pump 90 to line 92 to be combined into line 86 that is sent to regenerator 64 to remove the acid gases through line 66 to a reflux condenser 50, line 52 to reflux drum 54. The top stream 56 from reflux drum 54 is an acid gas stream that exits the system. A bottom stream 58 is pumped by reflux pump 60 and is recycled in stream 62 to regenerator 64. Also shown in the FIG. 1s an overhead stream 46 from second flash drum 44 that is combined with stream 66 to reflux condenser 50. An overhead stream 116 is sent from second flash drum 40 to reflux condenser 118 to line 120 and then to concentrator/reabsorber 24. A bottoms stream of lean absorbent exits the bottom of regenerator 64 in stream 76 to low pressure lean solvent pump 78 to stream 80 through lean-rich heat exchanger 36 to stream 94, to high pressure lean solvent pump 96, stream 98, chiller 100 to stream 104 and finally back to absorber 4.

Overall, aspects of the invention are associated with processes for purifying impure feed gas streams which advantageously allow the recovery of the desired components from these feed gas streams at high purity. The processes comprise contacting the impure feed gas with a semi-lean solvent and lean solvent in a two-stage absorber. An exemplary impure feed gas stream is predominantly a gas stream comprising hydrogen sulfide ($H_2S$), carbon dioxide and other sulfur compounds as impurities or contaminants. Those having skill in the art will recognize the applicability of the processes disclosed herein to any of a number of gas purification processes, and particularly those utilizing a physical solvent that preferentially absorbs the contaminants.

In a process where sulfur is removed or sulfur and CO2 are simultaneously captured (no separate CO2 absorption section), when the sulfur to CO2 ratio in the feed gas is low, the sulfur content in the acid gas to the downstream sulfur recovery unit (SRU) need to be concentrated to meet the requirement of the SRU.

Previous processes disclosed a flow scheme with a low pressure concentrator/re-absorber integrated with $H_2S$ rich solvent flash drum, and other processes disclosed the utilization of semi-lean solvent without a $CO_2$ absorption section. The two concepts are combined in this the present invention which, together with the use of a semi-lean/rich solvent exchanger, will provide significant cost savings over prior art applications of similar technology.

In a prior art design there is the use of multiple rich solvent flash drums, coolers, knockout drums, and recycle compressors are used to concentrate sulfur in the acid gas. The overhead streams from the rich solvent flash drums are at last sent back to the absorber. The total recycle stream back to the absorber increases the capacity and solvent requirement for the absorber.

This can be compared to the present invention that uses a concentrator/re-absorber-medium pressure rich solvent flash drum combination and the venting of the re-absorber overhead or sending it to an oxidizer eliminates two recycle compressors and related knockout drums and coolers and reduces recycle flow back to the absorber. The high pressure rich solvent flash drum and related compressor and cooler were retained to achieve the hydrocarbon or $H_2/CO_2$ recovery. Part of the bottom stream of the low pressure rich solvent flash drum which is downstream of the medium pressure rich solvent flash drum is used as semi-lean solvent to be sent to the middle of the absorber. The use of the semi-lean solvent reduces the lean solvent circulation rate. A semi-lean rich exchanger is utilized to save energy to heat part of the rich solvent stream before it enters the medium pressure rich solvent flash drum and cool the semi-lean solvent before it goes to the semi-lean solvent chiller. The above features of the new flow scheme enables it to have a smaller regenerator, reboiler and reflux condenser as well as smaller lean solvent pumps due to less lean solvent circulation rate and smaller absorber due to less recycle back to the absorber and lower lean solvent circulation rate. The above benefits are partially offset by the addition of concentrator/re-absorber, the use of semi-lean solvent, and the addition of related pumps.

While the subject matter has been described with what are presently considered the preferred embodiments, it is to be understood that the subject matter is not limited to the disclosed embodiments, but it is intended to cover various modifications and equivalent arrangements included within the scope of the appended claims.

The invention claimed is:

1. A gas purification process comprising:
   contacting an impure feed gas stream comprising hydrogen sulfide, carbon dioxide and sulfur compounds and a solvent stream in a counter-current absorber to provide a first overhead gas stream and a first solvent effluent bottoms stream comprising absorbed hydrogen sulfide, absorbed carbon dioxide and absorbed other sulfur compounds;
   passing the first solvent effluent bottoms stream to a concentrator/reabsorber and contacting the stream with a gas stream from a first downstream rich solvent flash drum or an inert gas stream in the concentrator/reabsorber to provide a second overhead gas stream and a second solvent effluent bottoms stream;
   splitting the second solvent effluent bottoms stream into a first stream and a second stream, heat-exchanging the first stream with a solvent stream from a downstream regenerator, heat-exchanging the second stream with a portion of a solvent stream from a second downstream rich solvent flash drum;
   after the heat-exchanges, combining said first stream and said second stream to produce a combined stream and passing the combined stream to the first downstream rich solvent flash drum, passing the solvent stream from the first downstream rich solvent flash drum to the second downstream rich solvent flash drum; passing partial of the solvent stream from the second rich solvent flash drum back to the counter-current absorber, passing a remaining portion of the solvent stream from the second downstream rich solvent flash drum to the downstream regenerator to provide an overhead gas stream and a bottom solvent effluent stream, and passing the bottom solvent effluent stream from the downstream regenerator back to a top of the counter-current absorber.

2. The process of claim 1 wherein said first overhead gas stream comprises a purified product gas stream.

3. The process of claim 1 wherein said first solvent effluent bottoms stream is passed to a high pressure rich solvent flash drum before it is passed to the concentrator/reabsorber.

4. The process of claim 3 wherein an overhead stream of the high pressure rich solvent flash drum is compressed, passed through a cooler and returned to said counter-current absorber.

5. The process of claim 3 wherein a bottoms stream is sent from said high pressure solvent flash drum to said concentrator/reabsorber.

6. The process of claim 1 wherein said impure feed gas stream is a gas stream selected from the group consisting of natural gas, synthesis gas, refinery flue gas and biogas.

7. The process of claim 6 wherein said impure feed gas stream comprises up to 70% by volume acid gas.

8. The process of claim 1 wherein said solvent stream comprises a physical solvent.

9. The process of claim 1, wherein the second overhead gas stream comprises carbon dioxide.

10. The process of claim 1 wherein said counter-current absorber is operated at a pressure from in a range of about 2700 kPa to about 10,000 kPa.

11. The process of claim 1, wherein the solvent is selected from group consisting of alcohols, glycol ethers, lactams, sulfolane, N-alkylated pyrrolidones, N-alkylated piperidines, cyclotetramethylenesulfone, N-alkyformamides, N-alkylacetamides, ether-ketones, propylene carbonate, N-methyl-2-pyrrolidone, N-formyl morpholine, and alkyl phosphates.

12. The process of claim 7 wherein the solvent comprises dimethyl ethers of polyethylene glycol.

13. The process of claim 1, further comprising:
   passing the first solvent effluent bottoms stream to a rich flash drum upstream of the counter-current stripper;
   passing the first solvent effluent bottoms stream to a high pressure flash drum to provide a second overhead gas stream and a second solvent effluent bottoms stream;
   sending at least a first portion of the second solvent effluent stream to a concentrator/reabsorber;
   passing a third solvent effluent bottoms stream from said concentrator/reabsorber to a regenerator to provide a third overhead gas stream and a third solvent effluent bottoms stream;
   recycling the third solvent effluent bottoms stream to a top of the counter-current absorber; and
   recovering a purified product gas stream at an overhead of the counter-current absorber.

* * * * *